United States Patent
Rook

(10) Patent No.: US 9,663,078 B1
(45) Date of Patent: May 30, 2017

(54) SYSTEMS AND METHODS FOR BRAKE ACTUATOR OPERATION SENSOR ERROR COMPENSATION

(71) Applicant: Goodrich Corporation, Charlotte, NC (US)

(72) Inventor: Todd Rook, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/980,053

(22) Filed: Dec. 28, 2015

(51) Int. Cl.
*B60T 8/17* (2006.01)
*B64C 25/44* (2006.01)
*B60T 8/171* (2006.01)

(52) U.S. Cl.
CPC ............ *B60T 8/1703* (2013.01); *B60T 8/171* (2013.01); *B64C 25/44* (2013.01)

(58) Field of Classification Search
CPC ................................................... B60T 8/1703
See application file for complete search history.

(56) References Cited

U.S. PATENT DOCUMENTS

| 7,317,981 | B2 * | 1/2008 | Evans | B60T 8/1703 701/3 |
| 2003/0093187 | A1 * | 5/2003 | Walker | B64C 13/20 701/1 |
| 2004/0164960 | A1 * | 8/2004 | Jacobus | B25J 9/1689 345/161 |
| 2007/0073908 | A1 * | 3/2007 | Gormley | G05B 19/0421 710/8 |
| 2013/0297101 | A1 * | 11/2013 | Hanlon | B60T 8/1703 701/3 |

* cited by examiner

*Primary Examiner* — Thomas Tarcza
*Assistant Examiner* — Alex C Dunn
(74) *Attorney, Agent, or Firm* — Snell & Wilmer L.L.P.

(57) ABSTRACT

The present disclosure provides systems and methods for brake actuator operation sensor error compensation. In various embodiments, a system for brake actuator operation sensor error compensation determines the existence of potential sensor errors and compensates for the effects of such errors.

15 Claims, 4 Drawing Sheets

SYSTEMS AND METHODS FOR BRAKE ACTUATOR OPERATION SENSOR ERROR COMPENSATION

FIELD

The present disclosure relates to aircraft braking systems, and more specifically, to systems and methods for sensor error detection for brake sensors.

BACKGROUND

An aircraft may comprise electro-mechanical brake actuators (EBA) that are configured to apply force to a brake stack on an aircraft wheel. A load cell may be coupled to the EBAs in order to provide feedback in regards to the amount of force that each EBA is applying to the brake stack. A high level command, such as brake control deflection from the cockpit, for example, may send a signal to an electro-mechanical brake actuator controller (EBAC), which in turn gets sent to the EBAs, which in turn each apply a force on the brake stack in order to decrease the radial velocity of the wheel. During an event where a sensor fails, the EBAC may over drive or underdrive one or more EBA.

SUMMARY

A method of brake actuator operation sensor error compensation is disclosed. The method may include polling, by an aircraft electro-mechanical brake actuator controller, a plurality of inputs including at least one of a plurality of load cell forces, a plurality of current sensor currents, and a plurality of position sensor positions, performing, by the controller, a conformance test in response to the polling, rejecting, by the controller, non-conforming inputs in response to the conformance test, and outputting, by the controller, a compensation signal to a command force controller. In various embodiments, the command force controller includes the aircraft electro-mechanical brake actuator controller.

In various embodiments, the conformance test includes performing a least squares fit of the plurality of inputs whereby non-conforming inputs are identified for rejection. In various embodiments, the conformance test further includes performing a Euclidean fit of the plurality of inputs whereby non-conforming inputs are identified for rejection. In various embodiments, the conformance test further includes performing a medial least squares fit of the plurality of inputs whereby non-conforming inputs are identified for rejection. In various embodiments, the conformance test further includes performing a planar fit of subsets of the plurality of inputs, wherein median calculations are performed of coefficients, whereby non-conforming inputs are identified for rejection.

In various embodiments, the plurality of inputs includes four inputs, and wherein the subsets include three of the four inputs. In various embodiments, the compensation signal includes an indication to increase or decrease a braking force. In various embodiments, the polling, by an aircraft electro-mechanical brake actuator controller, is performed by at least one of a measured current error detector, a measured position error detector, and a measured force error detector logically partitioned within the electro-mechanical brake actuator controller.

A tangible, non-transitory memory configured to communicate with a controller is also disclosed. The tangible, non-transitory memory may have instructions stored thereon that, in response to execution by the controller, cause the controller to perform operations including a method of brake actuator operation sensor error compensation.

A system for brake actuator operation sensor error compensation is also disclosed. The system may include at least one of a first load cell, a second load cell, a third load cell, and a fourth load cell each in communication with a command force controller and a measured force error detector, a first current sensor, a second sensor, a third current sensor, and a fourth current sensor each in communication with the command force controller and a measured current error detector, and a first position sensor, a second position sensor, and a third position sensor, each in communication with the command force controller and a measured position error detector. In various embodiments, an output compensation signal is output to the command force controller by the at least one of the measured current error detector, the measured position error detector, and the measured force error detector. In various embodiments, the command force controller commands an electric brake actuator to actuate an actuator motor whereby a pressure plate exerts a force on a disc in response to the output compensation signal. The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In various embodiments, systems with feedback control may become inoperable if a sensor which provides the feedback fails. The failure of a single sensor may cause an entire system to fail due to the dependence of other components on the failed sensor. Various systems and methods to address these challenges are presented herein. For instance, a system may be configured to receive data from a secondary operable sensor in the event that the primary sensor fails.

Various embodiments include an aircraft electro-mechanical brake actuator controller (EBAC). The EBAC may comprise a processor. The EBAC involves the transmission of power and data across a system of circuits and wires. According to instructions stored thereon, a tangible, non-transitory memory may be configured to communicate with the EBAC.

While described in the context of aircraft applications, and more specifically, in the context of brake control, the various embodiments of the present disclosure may be applied to any suitable application.

Figure 1:
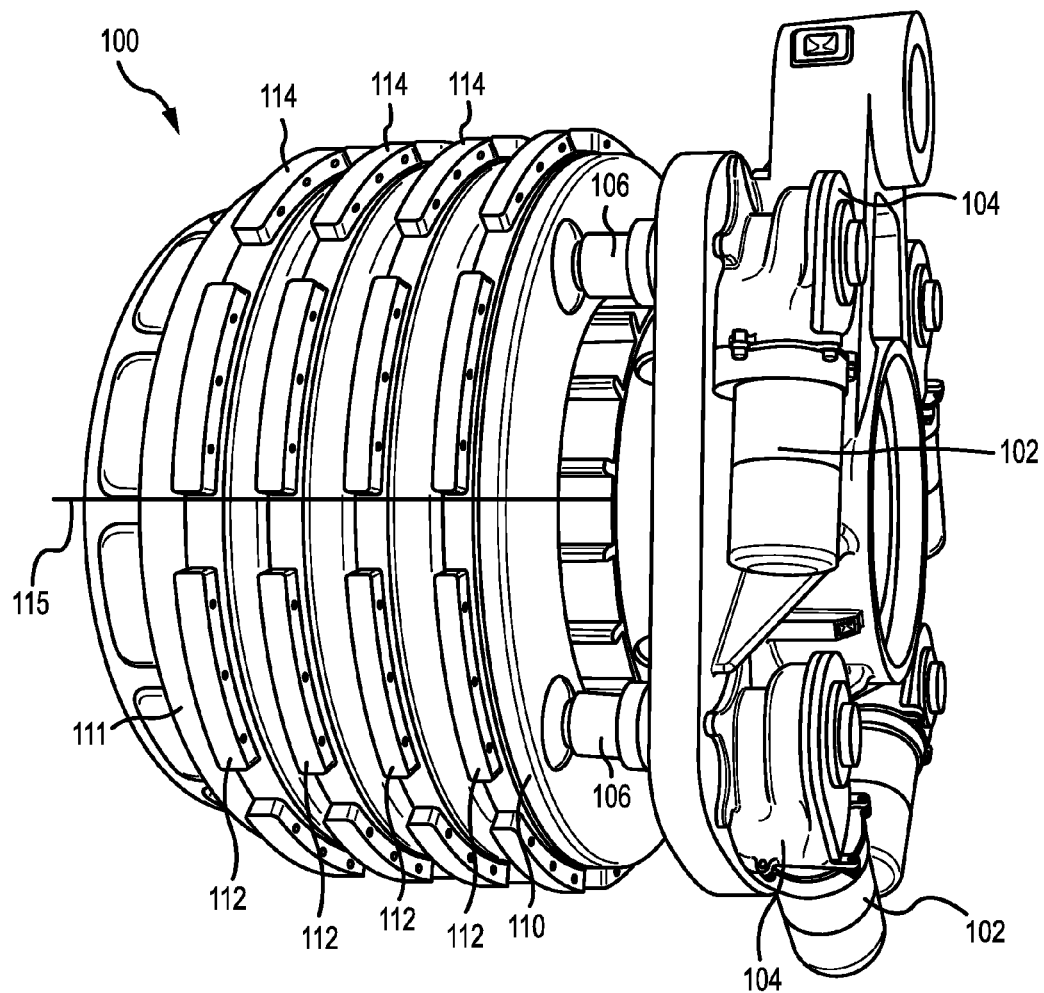
FIG. 1 illustrates an aircraft brake in accordance with various embodiments.

FIG. 1 illustrates an aircraft brake 100 in accordance with various embodiments. Aircraft brake 100 may include a plurality of actuator motors 102, a plurality of electromechanical brake actuators 104, a plurality of ball nuts 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. When sufficient force is exerted on rotating discs 112 via pressure plate 110, the rotating discs 112 will stop rotating.

In order to exert this force onto pressure plate 110, actuator motor 102 may cause electromechanical brake actuator 104 to actuate. In various embodiments, actuator motor 102 may be a brushless motor, such as a permanent magnet synchronous motor (PMSM), a permanent-magnet motor (PMM) or the like. In various embodiments, and with reference to FIG. 2, electromechanical brake actuator 104 may be coupled to or otherwise operate a motor shaft 204 and a pressure generating device, such as, for example, a ball screw, a ram, and/or the like. In response to actuation, electromechanical brake actuator 104 causes the motor shaft 204 to rotate. Rotation of the motor shaft 204 may cause rotation of a ball screw 206, and rotational motion of the ball screw 206 may be transformed into linear motion of a ball nut 106. With reference again to FIG. 1, linear translation of ball nut 106 towards pressure plate 110 applies force on pressure plate 110 towards end plate 111.

Electromechanical brake actuator 104 is actuated in response to current being applied to actuator motor 102. The amount of force applied by electromechanical brake actuator 104 is related to the amount of current applied to actuator motor 102. With reference again to FIG. 2, in various embodiments, an electromechanical brake actuator control system 200 may comprise a current sensor 212 to detect an amount of current provided to actuator motor 102. Current sensor 212 may be in communication with actuator motor 102 and/or with various other components of an electromechanical brake actuator 104, an electromechanical brake actuator control system 200, and/or an aircraft. In various embodiments, current sensor 212 may be disposed on or adjacent to actuator motor 102. However, current sensor 212 may be disposed in any location suitable for detection of electrical current supplied to the actuator motor 102.

Application of current to actuator motor 102 causes rotation of motor shaft 204. In various embodiments, electromechanical brake actuator control system 200 may comprise a position sensor 208. Position sensor 208 may be configured so as to measure the rotational speed and position of motor shaft 204. In various embodiments, position sensor 208 may be disposed in or adjacent to electromechanical brake actuator 104, or on or adjacent to actuator motor 102. However, position sensor 208 may be disposed in any location suitable for detection of the rotational speed and position of motor shaft 204. In various embodiments, position sensor 208 may comprise a resolver, tachometer, or the like.

In various embodiments, electromechanical brake actuator control system 200 may comprise a load cell 202. Load cell 202 may be configured so as to measure the amount of force being applied between ball nut 106 and pressure plate 110. In various embodiments, load cell 202 may be disposed in or adjacent to electromechanical brake actuator 104, or on or adjacent to ball nut 106. However, load cell 202 may be disposed in any location suitable for detection of the force being applied between ball nut 106 and pressure plate 110. A controller may receive the detected force and rotational speed, and calculate an adjusted force and an adjusted rotational speed based on those detected values. In various embodiments, electromechanical brake actuator control system 200 may comprise a fault tolerant module 210.

In various embodiments, a system for brake actuator operation with sensor fault tolerant technology comprises one or more load cell 202, one or more position sensor 208, one or more current sensor 212 and at least one controller. In various embodiments, fault tolerant module 210 may be a controller and/or processor. In various embodiments, fault tolerant module 210 may be implemented in a single controller and/or processor. In various embodiments, fault tolerant module 210 may be implemented in multiple controllers and/or processors. In various embodiments, fault tolerant module 210 may be implemented in an electromechanical actuator controller and/or a brake control unit.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Figure 2:
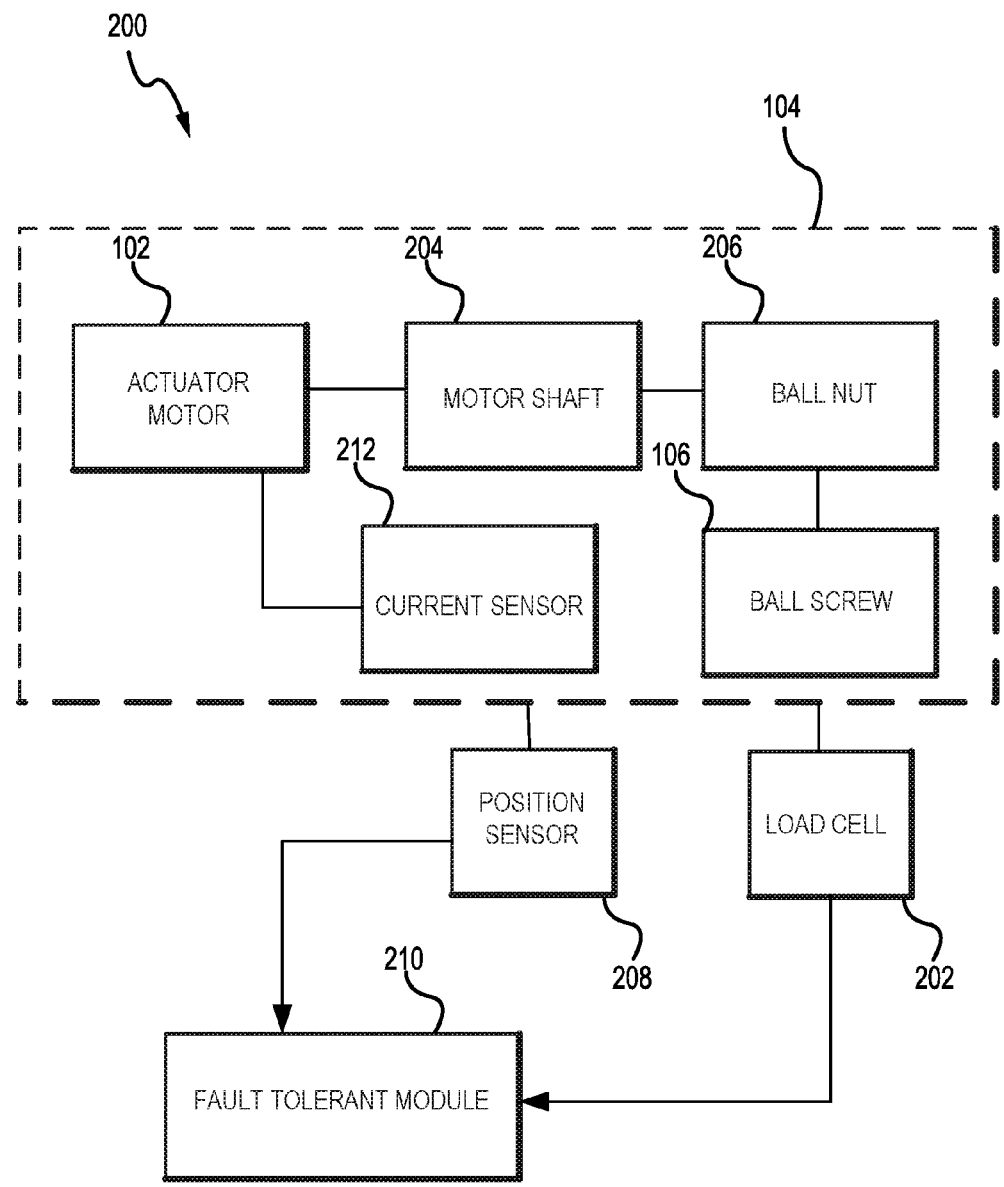
FIG. 2 illustrates a block diagram of an electromechanical brake actuator control system in accordance with various embodiments.
Figure 3:
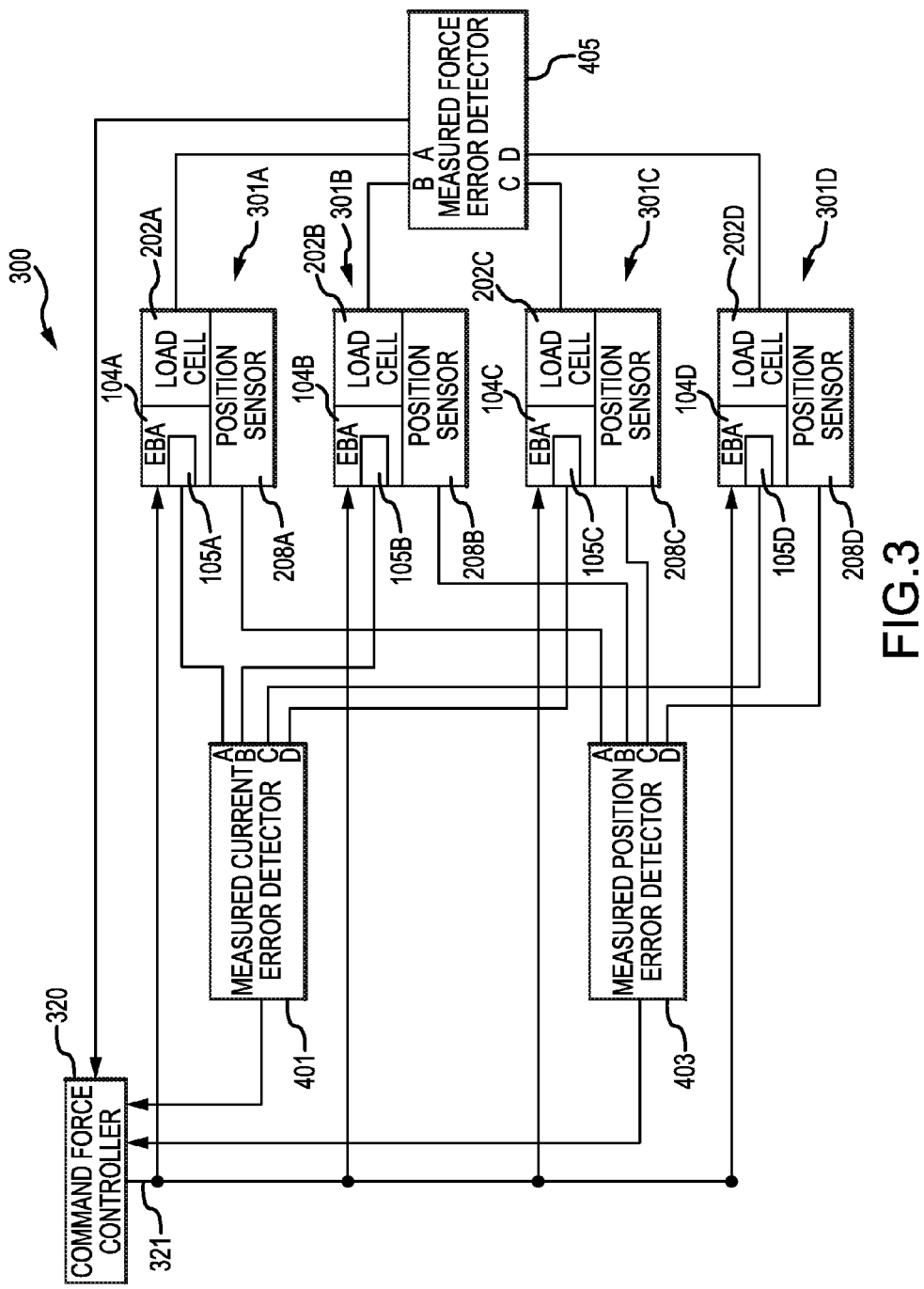
FIG. 3 illustrates a schematic view of a system for brake actuator operation sensor error compensation in accordance with various embodiments.

FIG. 3 illustrates, in accordance with various embodiments, a system 300 for brake actuator operation with sensor fault tolerant technology (hereinafter "system 300"). In various embodiments, system 300 may comprise a closed-loop system. In various embodiments, system 300 may be implemented in a machine-readable non-transitory medium and performed by a controller, for example, a fault tolerant module 210 (FIG. 2). In various embodiments, system 300 may be implemented on a special use controller, field programmable gate array, or the like. In various embodiments, system 300 may be implemented on one or more controllers. In various embodiments, system 300 may be implemented in a controller, for example a fault tolerant module 210 (FIG. 2) that comprises a logical unit of an electro-mechanical brake actuator controller (EBAC).

In various embodiments, system 300 may comprise subsystems with like components denoted by like numerals with differing alphabetical characters, for example brake subsystems 301A, 301B, 301C, and 301D may be like subsystems containing further like subsystems such as EBAs 104A, 104B, 104C, and 104D.

In various embodiments, system 300 may receive a command force 321 from a command force controller 320. Command force 321 may be sent via an electro-mechanical brake actuator controller (EBAC). Command force 321 may be the force which is being commanded to be applied to an electro-mechanical brake actuator (EBA) in order to apply a braking force to a vehicle such as an aircraft, for example. In various embodiments, command force controller 320 comprises a logical aspect of the EBAC.

The system 300 may monitor the behavior of the different EBAs in response to command force 321 by monitoring various sensors. For example, a current sensor 105A may be associated with an EBA 104A of a subsystem 301A that may provide the current consumed by the actuator motor 102 of the subsystem 301A. A position sensor 208A may be associated with an EBA 104A of a subsystem 301A that may provide the position of the motor shaft 204 of the subsystem 301A. A load cell 202A may be associated with an EBA 104A of a subsystem 301A that may provide the force exerted between ball nut 106 and pressure plate 110 associated with an EBA 104A of a subsystem 301A.

Each current sensor 105A, 105B, 105C, 105D may provide current data to a measured current error detector 401. Each position sensor 208A, 208B, 208C, 208D may provide position data to a measured position error detector 403. Each load cell 202A, 202B, 202C, and 202D may provide force data to a measured force error detector 405. Each of the measured force error detector 405, the measured position error detector 403, and current measured current error detector 401 may also receive the command force 321. In this manner the detectors 401, 403, and 405 may perform methods disclosed further herein whereby sensor malfunctions may be detected and the effects of these malfunctions ameliorated.

Figure 4:
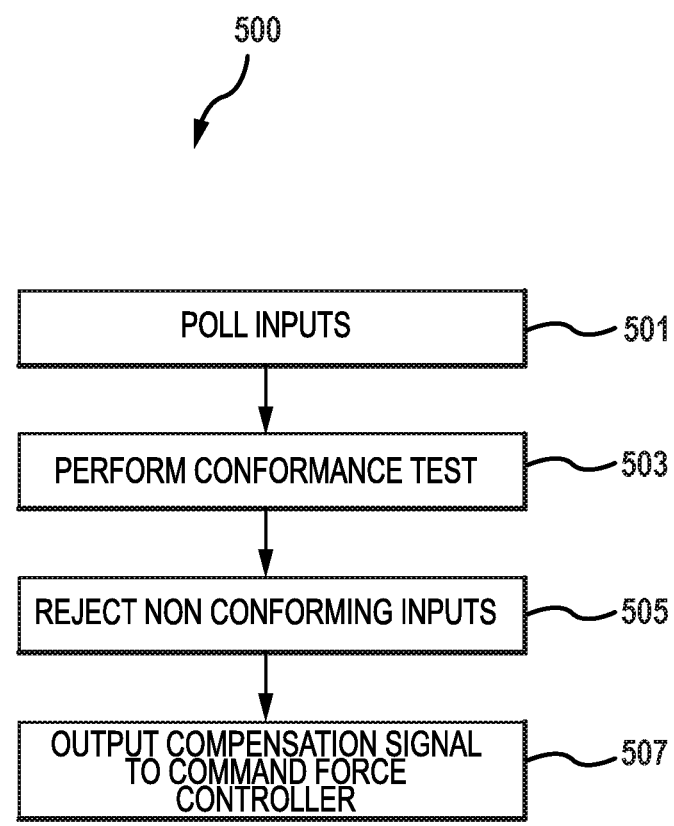
FIG. 4 illustrates a method for brake actuator operation sensor error compensation, in accordance with various embodiments.

For example, with reference to FIG. 4, a sensor malfunction amelioration method 500 is disclosed. A sensor malfunction amelioration method 500 may be implemented in one or more detector 401, 403, and/or 405. In various embodiments one or more of detector 401, 403, and 405 may be omitted, for instance, a particular embodiment may have a one or more of a set comprising a measured force error detector 405, a measured position error detector 403, and/or a measured current error detector 401, or may have two or more of such set, or may have all three such detectors.

A sensor malfunction amelioration method 500 may comprise polling inputs (step 501). For instance the implementing detector 401, 403, and/or 405 may poll the inputs A, B, C, D, and ingest the sensor data present thereon. The sensor data thereon may comprise a value sampled upon one or more point in time ("polled"). Errors may exist in the sensor data, such as due to wear, malfunction, and sampling or quantization errors.

Subsequently a conformance test may be performed (step 503). For instance, errors, such as those associated with input(s) indicative of a malfunctioning sensor may be determined. Simply averaging the inputs may prove unreliable, as an input having an error may deviate significantly more from the other inputs than the other inputs do from one another. Thus, a mechanism of rejecting inputs which are corrupted by such errors is implemented. In addition, perturbations in various inputs may arise for mechanical reasons. For instance, a brake rotor or stator may become asymmetrically shaped through wear over time and thus periodic perturbations may arise in different inputs over time as the inputs are periodically polled. Thus, the mechanism of rejecting inputs is desired to be adaptable, for instance, capable of implementation at every polling interval, and is further desired to be capable of differentiating between (1) errors which cause a value of an input to lie outside a planar fit with the other inputs (likely to be a malfunctioning sensor) and (2) errors which do not extract the value of the input from a planar fit with the other inputs (likely to be a mechanical wobble, precession, asymmetry, or other perturbation of an aspect of the braking system, for instance, a rotating mass component).

As such, different combinations of spatial curve fits are performed. For instance, a least squares fit of the four inputs may be formed. Least squares fitting is an approach in regression analysis that determines an approximate solution of an over determined system. Because there are more equations than unknown values in an over determined system, least squares fitting provides an overall solution that minimizes the sum of the squares of the errors made in the results of each equations. Stated differently, the best fit minimizes the sum of squared residuals (a difference between an observed value (e.g., input) and a fitted value provided by a model). As such, the solution is an approximate solution, and as such is subject to different approaches whereby the solution may be optimized. Different mechanisms of least squares fitting may be applied to the various inputs. For instance, in various embodiments, a Euclidean fit may be performed (which has some level of outlier rejection) and/or a medial least squares fit may be performed (which may have superior outlier rejection).

Moreover, and as briefly mentioned, planar fits of different combinations of three of the four inputs may be performed (for instance {A B C}, {A B D}, {B C D}, and {A C D}) and compared. In various embodiments, median calculations may be made of the coefficients. As such, inputs with values that lie outside a planar fit of other inputs may be rejected. These values and inputs are called "outlier values" and "non-conforming inputs" respectively, and may be rejected (step 505).

Thus, perturbations in the input (such as a load on a load cell due to disc distortion) may be compensated for if desired and yet malfunctioning sensors may yet be determined despite such perturbations Finally, a compensation signal is provided to the command force controller 320 whereby the command force 321 may be varied whether collectively or independently for each EBA 104A, 104B, 104C, and 104D, whereby brake performance may be enhanced (step 507). For instance, the compensation signal may comprise an indication to increase or decrease a braking force.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of brake actuator operation sensor error compensation comprising:
   polling, by an aircraft electro-mechanical brake actuator controller, a plurality of inputs comprising at least one of:
      a plurality of load cell forces;
      a plurality of current sensor currents; and
      a plurality of position sensor positions;
   performing, by the controller, a conformance test in response to the polling;
   rejecting, by the controller, non-conforming inputs in response to the conformance test; and
   outputting, by the controller, a compensation signal to a command force controller,
   wherein the command force controller comprises the aircraft electro-mechanical brake actuator controller,
   wherein the conformance test comprises performing a least squares fit of the plurality of inputs whereby non-conforming inputs are identified for rejection.

2. The method according to claim 1, wherein the conformance test further comprises:
   performing a Euclidean fit of the plurality of inputs whereby non-conforming inputs are identified for rejection.

3. The method according to claim 2, wherein the conformance test further comprises:
   performing a medial least squares fit of the plurality of inputs whereby non-conforming inputs are identified for rejection.

4. The method according to claim 3, wherein the conformance test further comprises:
   performing a planar fit of subsets of the plurality of inputs, wherein median calculations are performed of coefficients, whereby non-conforming inputs are identified for rejection.

5. The method according to claim 4, wherein the plurality of inputs comprises four inputs, and wherein the subsets comprise three of the four inputs.

6. The method according to claim 5, wherein the compensation signal comprises an indication to increase or decrease a braking force.

7. A tangible, non-transitory memory configured to communicate with a controller, the tangible, non-transitory memory having instructions stored thereon that, in response to execution by the controller, cause the controller to perform operations comprising:
   polling, by an aircraft electro-mechanical brake actuator controller, a plurality of inputs comprising at least one of:
      a plurality of load cell forces;
      a plurality of current sensor currents; and
      a plurality of position sensor positions;
   performing, by the controller, a conformance test in response to the polling;
   rejecting, by the controller, non-conforming inputs in response to the conformance test; and
   outputting, by the controller, a compensation signal to a command force controller,
   wherein the command force controller comprises the aircraft electro-mechanical brake actuator controller,
   wherein the conformance test comprises performing a least squares fit of the plurality of inputs whereby non-conforming inputs are identified for rejection.

8. The tangible, non-transitory memory according to claim 7, wherein the conformance test further comprises:
   performing a Euclidean fit of the plurality of inputs whereby non-conforming inputs are identified for rejection.

9. The tangible, non-transitory memory according to claim 8, wherein the conformance test further comprises:
   performing a medial least squares fit of the plurality of inputs whereby non-conforming inputs are identified for rejection.

10. The tangible, non-transitory memory according to claim 9, wherein the conformance test further comprises:

performing a planar fit of subsets of the plurality of inputs, wherein median calculations are performed of coefficients, whereby non-conforming inputs are identified for rejection.

11. The tangible, non-transitory memory according to claim 10, wherein the plurality of inputs comprises four inputs, and wherein the subsets comprise three of the four inputs.

12. The tangible, non-transitory memory according to claim 11, wherein the compensation signal comprises an indication to increase or decrease a braking force.

13. The tangible, non-transitory memory according to claim 7, wherein the polling, by the aircraft electro-mechanical brake actuator controller, is performed by at least one of a measured current error detector, a measured position error detector, and a measured force error detector logically partitioned within the electro-mechanical brake actuator controller.

14. A system for brake actuator operation sensor error compensation, wherein the system comprises at least one of:

a first load cell, a second load cell, a third load cell, and a fourth load cell each in communication with a command force controller and a measured force error detector;

a first current sensor, a second sensor, a third current sensor, and a fourth current sensor each in communication with the command force controller and a measured current error detector; and a first position sensor, a second position sensor, and a third position sensor, each in communication with the command force controller and a measured position error detector, wherein an output compensation signal is output to the command force controller by the at least one of:
the measured current error detector,
the measured position error detector, and
the measured force error detector,
wherein the command force controller commands an electric brake actuator to actuate an actuator motor,
whereby a pressure plate exerts a force on a disc in response to the output compensation signal.

15. A method of brake actuator operation sensor error compensation comprising:

polling, by an aircraft electro-mechanical brake actuator controller, a plurality of inputs comprising at least one of:
a plurality of load cell forces;
a plurality of current sensor currents; and
a plurality of position sensor positions;

performing, by the controller, a conformance test in response to the polling;

rejecting, by the controller, non-conforming inputs in response to the conformance test; and outputting, by the controller, a compensation signal to a command force controller, wherein the polling, by the aircraft electro-mechanical brake actuator controller, is performed by at least one of a measured current error detector, a measured position error detector, and a measured force error detector logically partitioned within the electro-mechanical brake actuator controller.

* * * * *